US 6,618,161 B1

(12) United States Patent
Fresk et al.

(10) Patent No.: US 6,618,161 B1
(45) Date of Patent: Sep. 9, 2003

(54) PRINTER SYSTEM AND METHOD OF REPRODUCING AN IMAGE

(75) Inventors: J. Sean Fresk, Eagle, ID (US); Dellas G. Frederiksen, Boise, ID (US); Chris R. Gunning, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/179,706

(22) Filed: Oct. 26, 1998

(51) Int. Cl.⁷ .............................................. F41C 27/06
(52) U.S. Cl. ...................... 358/1.15; 358/401; 358/468; 358/496; 358/498
(58) Field of Search ................................ 358/401, 496, 358/498, 400, 1.6, 1.15, 1.16, 1.9, 474, 1.11, 1.14

(56) References Cited

U.S. PATENT DOCUMENTS

| | | | |
|---|---|---|---|
| 4,211,483 A | * | 7/1980 | Hannigan et al. |
| 4,248,525 A | * | 2/1981 | Sterrett ........................ 355/14 |
| 4,928,252 A | * | 5/1990 | Gabbe et al. .............. 358/1.12 |
| 5,442,432 A | * | 8/1995 | Tani ............................ 355/324 |
| 5,481,353 A | * | 1/1996 | Hicks et al. |
| 5,493,367 A | * | 2/1996 | Altrieth, III et al. |
| 5,724,490 A | | 3/1998 | Shibaki et al. .............. 395/114 |
| 5,758,043 A | * | 5/1998 | Takizawa et al. ........... 395/115 |
| 5,768,488 A | * | 6/1998 | Stone et al. ................. 358/1.1 |
| 5,793,935 A | * | 8/1998 | Ko ............................ 358/1.18 |
| 5,796,496 A | * | 8/1998 | Ono ............................ 358/498 |
| 5,808,747 A | | 9/1998 | Telle ........................... 358/296 |
| 5,822,500 A | * | 10/1998 | Utsunomiya et al. ....... 395/101 |
| 5,838,883 A | * | 11/1998 | Pekelman .................... 395/106 |
| 5,841,548 A | * | 11/1998 | Mitome et al. |
| 5,847,857 A | * | 12/1998 | Yajima et al. ............... 358/468 |
| 5,859,711 A | * | 1/1999 | Barry et al. ................. 358/296 |
| 5,889,597 A | * | 3/1999 | Ara et al. .................... 358/473 |
| 5,896,206 A | * | 4/1999 | Kellogg ....................... 358/498 |
| 5,956,160 A | * | 9/1999 | Watanabe .................... 358/496 |
| 5,969,826 A | * | 10/1999 | Dash et al. .................. 358/400 |
| 6,018,398 A | * | 1/2000 | Bunker |
| 6,069,707 A | * | 5/2000 | Pekelman |
| 6,160,642 A | * | 12/2000 | Mui et al. .................... 358/498 |
| 6,166,826 A | * | 12/2000 | Yokoyama ................. 358/1.16 |
| 6,188,490 B1 | * | 2/2001 | Miyake ...................... 358/1.18 |
| 6,313,919 B1 | * | 11/2001 | Nakagiri et al. ........... 358/1.11 |

FOREIGN PATENT DOCUMENTS

| EP | 0478340 A2 | 4/1992 | ............. H04N/1/32 |
|---|---|---|---|
| EP | 0697648 | * | 8/1995 |

* cited by examiner

Primary Examiner—Edward Coles
Assistant Examiner—Tia Carter

(57) ABSTRACT

The present invention includes a printer system and a method of reproducing an image. One aspect of the present invention provides a printing system including a scanner including an image reception device configured to flatbed scan a print job including a plurality of pages and output image data corresponding to the pages; a print engine controller coupled with the scanner and configured to receive the print job including the image data corresponding to the pages; and a print engine coupled with the print engine controller and configured to print a plurality of collated copies of the print job.

23 Claims, 7 Drawing Sheets

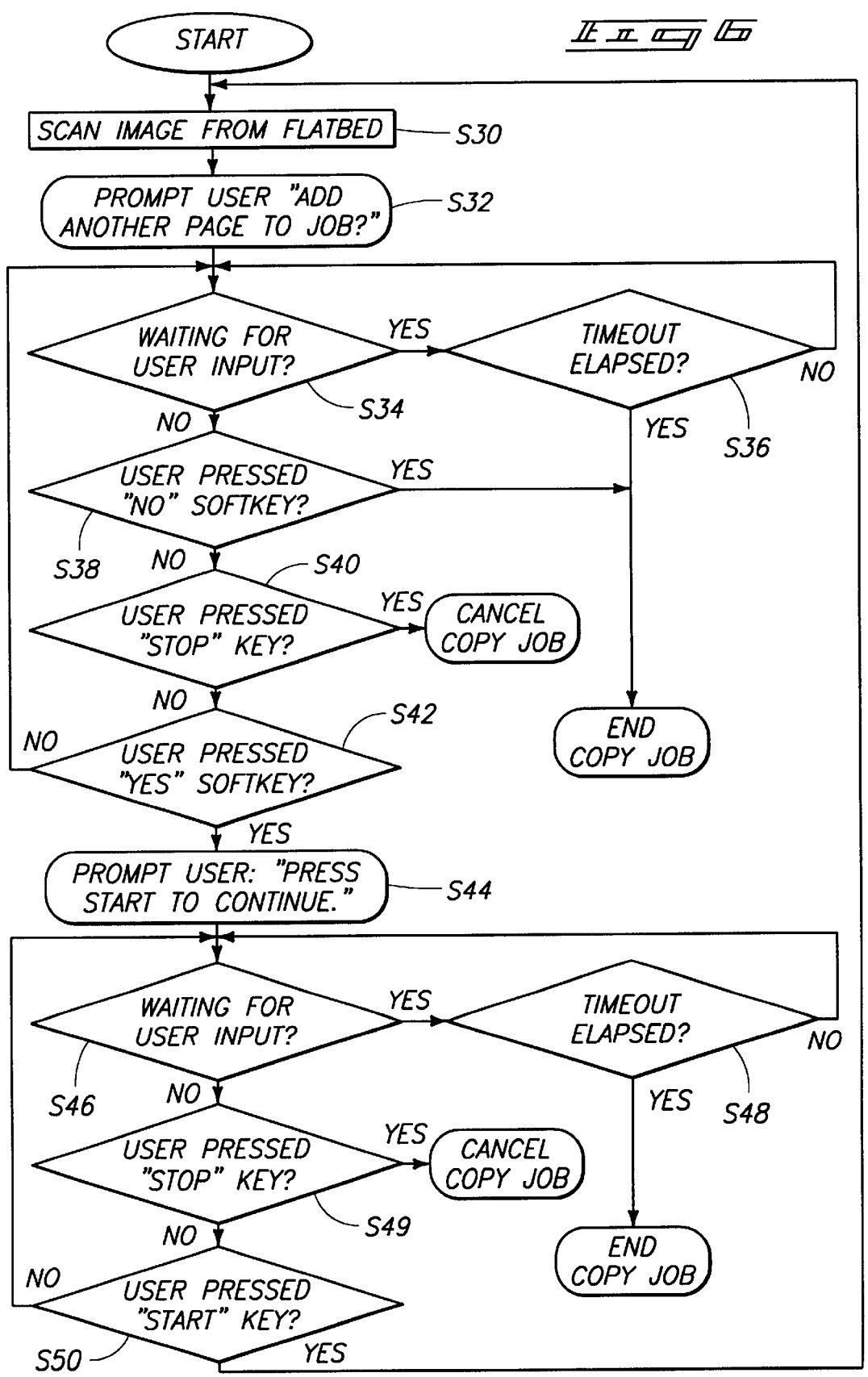

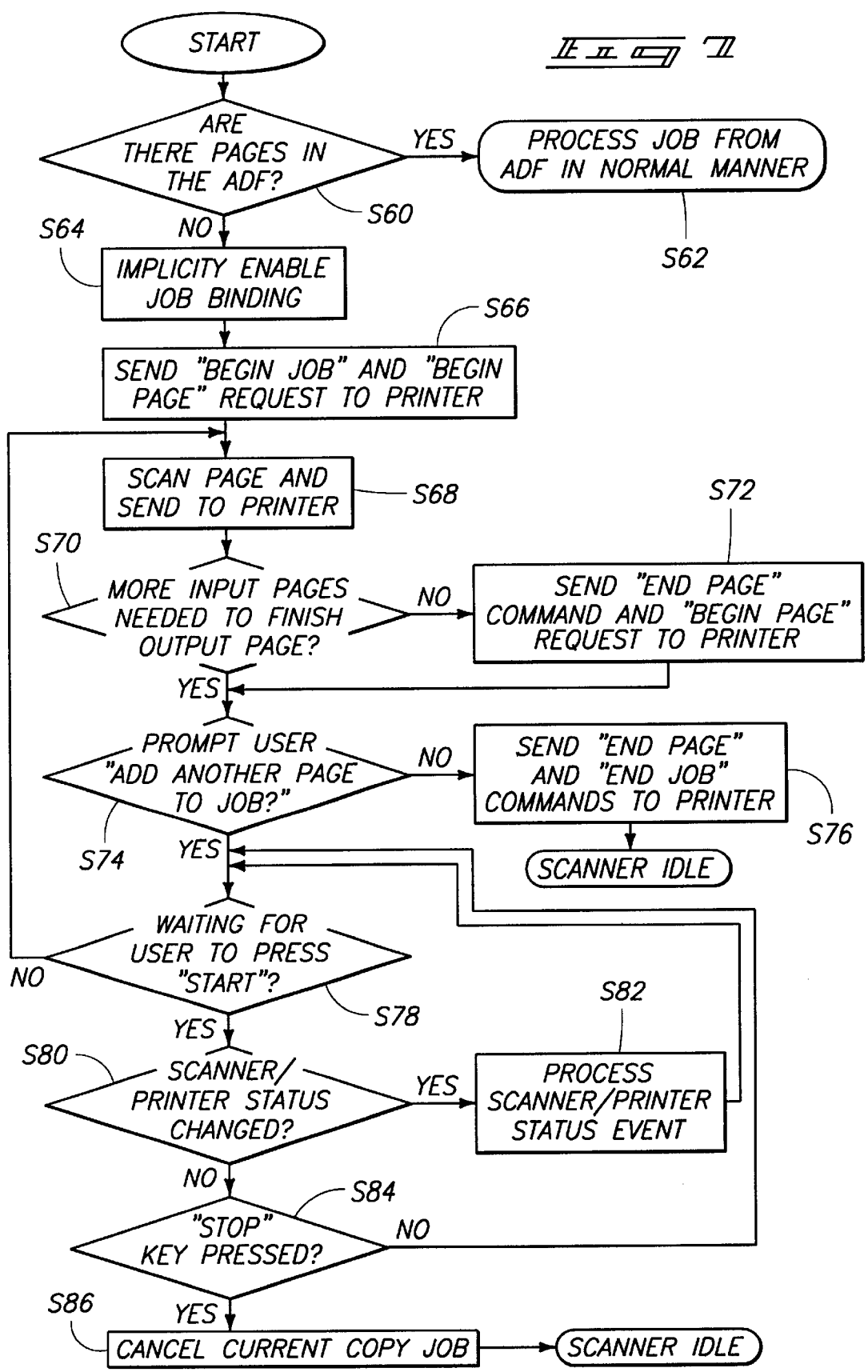

PRINTER SYSTEM AND METHOD OF REPRODUCING AN IMAGE

FIELD OF THE INVENTION

The present invention relates to a printer system and a method of reproducing an image.

BACKGROUND OF THE INVENTION

Printers in conventional arrangements have been configured to interface with one or more associated computers and to generate a plurality of images responsive to received page description language data from such associated computers. More recently, the roles of printers have been expanded to provide more varied functions. For example, some printers have been developed to provide conventional printing operations in combination with an associated computer as well as to provide operations normally handled by copiers.

Such printers can be coupled with one or more accessory devices to provide enhanced flexibility and an increased number of functions. Some exemplary printer arrangements are configured to couple with a scanner accessory device to provide a printer system capable of typical copy functions. Scanners are configured to convert images provided upon media into electronic information. The converted electronic data corresponding to the images can be transferred to the associated printer. Thereafter, the printer operates to reproduce the scanned images upon outputted media.

Conventional scanner arrangements typically include one or more mechanisms configured to provide scanning of images of pages to be reproduced. Typical scanner arrangements include an automatic document feeder (ADF) as well as a flatbed (glass) area. Such permits rapid reproduction of a plurality of documents having a common size as well as traditional copying of pages having different sizes.

These conventional printer arrangements suffer from distinct disadvantages. For example, conventional systems fail to provide a convenient copying process for reproducing a plurality of images which are originally provided on pages of different sizes. Using conventional arrangements, a user runs two sets of jobs through the copier to enable reproduction of a multi-page job from the flatbed area. A first job is a single copy of all the different sized originals individually copied from the flatbed. The first copy provides the images to be reproduced onto paper having a common size. Thereafter, the first job comprising the multiple images provided on common sized paper is fed through the automatic document feeder providing the second job. Such permits the second print job to be mass copied, collated, stapled, etc. However, some image quality is sacrificed because the final output job (i.e., second job) is copied from a copy (i.e., first job).

Therefore, a need exists to provide improved devices and methodologies for copying multi-page jobs from a flatbed area of a scanner or copier.

SUMMARY OF THE INVENTION

The present invention includes a printer system and a method of reproducing an image. One aspect of the present invention provides a printing system including a scanner including an image reception device configured to flatbed scan a print job including a plurality of pages and output image data corresponding to the pages; a print engine controller coupled with the scanner and configured to receive the print job including the image data corresponding to the pages; and a print engine coupled with the print engine controller and configured to print a plurality of collated copies of the print job.

Another aspect of the present invention provides a method of reproducing an image comprising: providing a scanner; coupling a printer with the scanner; flatbed scanning a print job comprising a plurality of pages using the scanner; and printing a plurality of collated copies of the print job.

Yet another aspect of the present invention provides a method of reproducing an image comprising: providing a scanner; coupling a printer with the scanner; flatbed scanning a plurality of input pages using the scanner; outputting image data from the scanner which corresponds to the input pages; and printing at least one output page having image data from plural input pages using the printer.

DESCRIPTION OF THE DRAWINGS

Preferred embodiments of the invention are described below with reference to the following accompanying drawings.

FIG. 6 is a flow chart illustrating one method for implementing job binding processing in accordance with the present invention.

FIG. 7 is a flow chart illustrating one method for implementing job binding processing of a flatbed N-Up print job in accordance with the present invention.

DETAILED DESCRIPTION OF THE INVENTION

This disclosure of the invention is submitted in furtherance of the constitutional purposes of the U.S. Patent Laws "to promote the progress of science and useful arts" (Article 1, Section 8).

Figure 1:
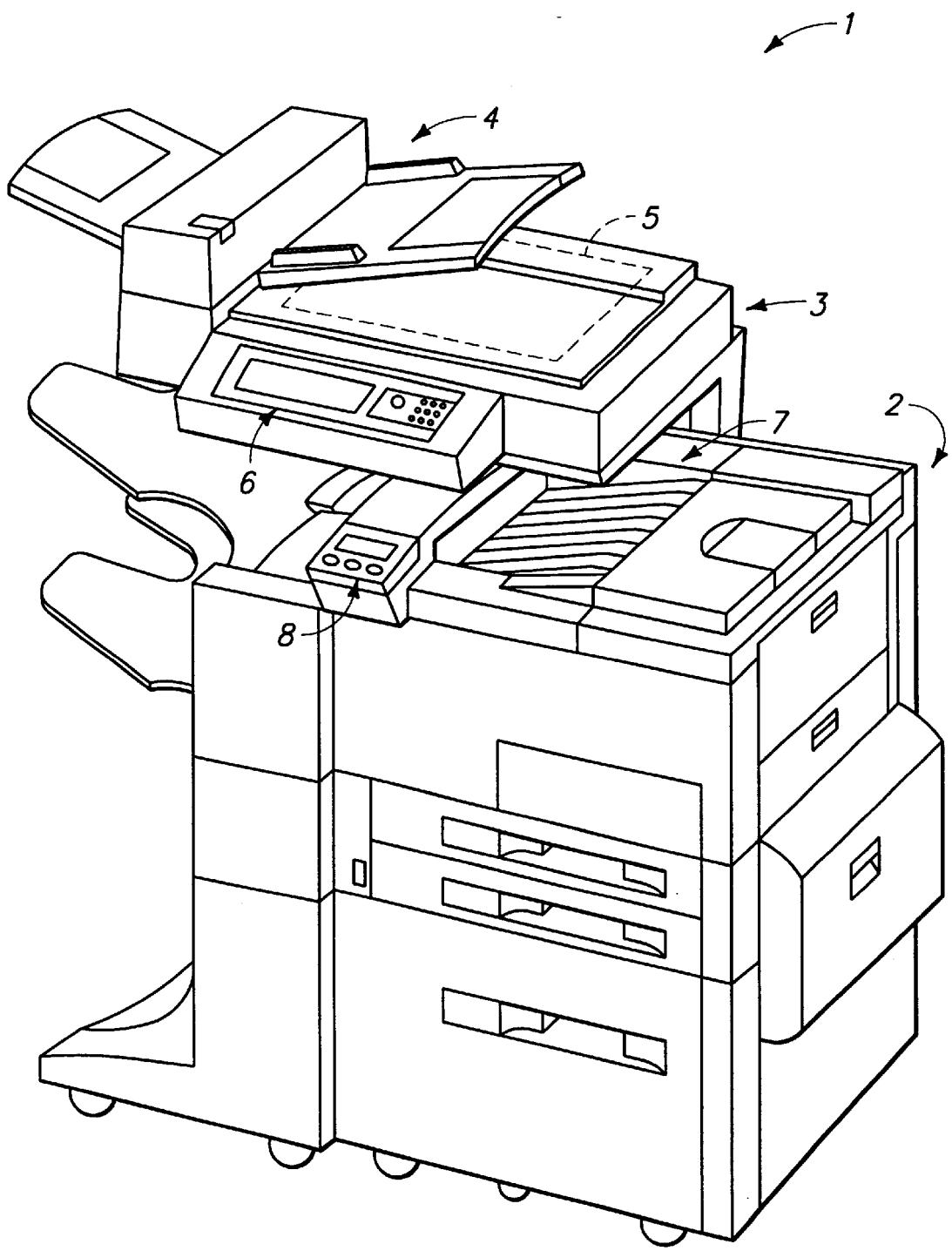
FIG. 1 is an isometric view of an exemplary printer system of the present invention.

Referring to FIG. 1, an exemplary configuration of a printer system 1 according to the present invention is illustrated. The described embodiment discloses a printer system although the present invention is applicable to other image forming device technologies. The depicted printer system 1 comprises a printer 2 and a scanner 3. In general, scanner 3 includes an input device adapted to receive images to be reproduced. Scanner 3 generates and outputs image data corresponding to the images to printer 2. Printer 2 comprises a network printer in an exemplary embodiment.

The depicted scanner 3 includes an automatic document feeder (ADF) 4 to provide automatic feeding and scanning of one or more documents. Alternatively, flatbed scanning may be provided by lifting automatic document feeder 4 and placing individual pages upon a flatbed image reception device 5, such as a flatbed window of scanner 3. Scanner 3 further includes a user interface 6 configured to display status information regarding operation of scanner 3. User interface 6 is also operable to prompt a user and to receive input from a user to control operation of scanner 3.

An interface (not shown in FIG. 1) couples printer 2 and scanner 3. Exemplary interfaces include a parallel connection, or an IEEE-1394 serial bus. Printer 2 includes a print engine (not shown in FIG. 1) configured to provide an image upon media which corresponds to received image data. Printed media including the images are provided to an output bin 7. The depicted printer 2 also includes a user interface 8 configured to display status information of printer 2. User interface 8 is also operable to prompt a user and receive commands from a user.

Figure 2:
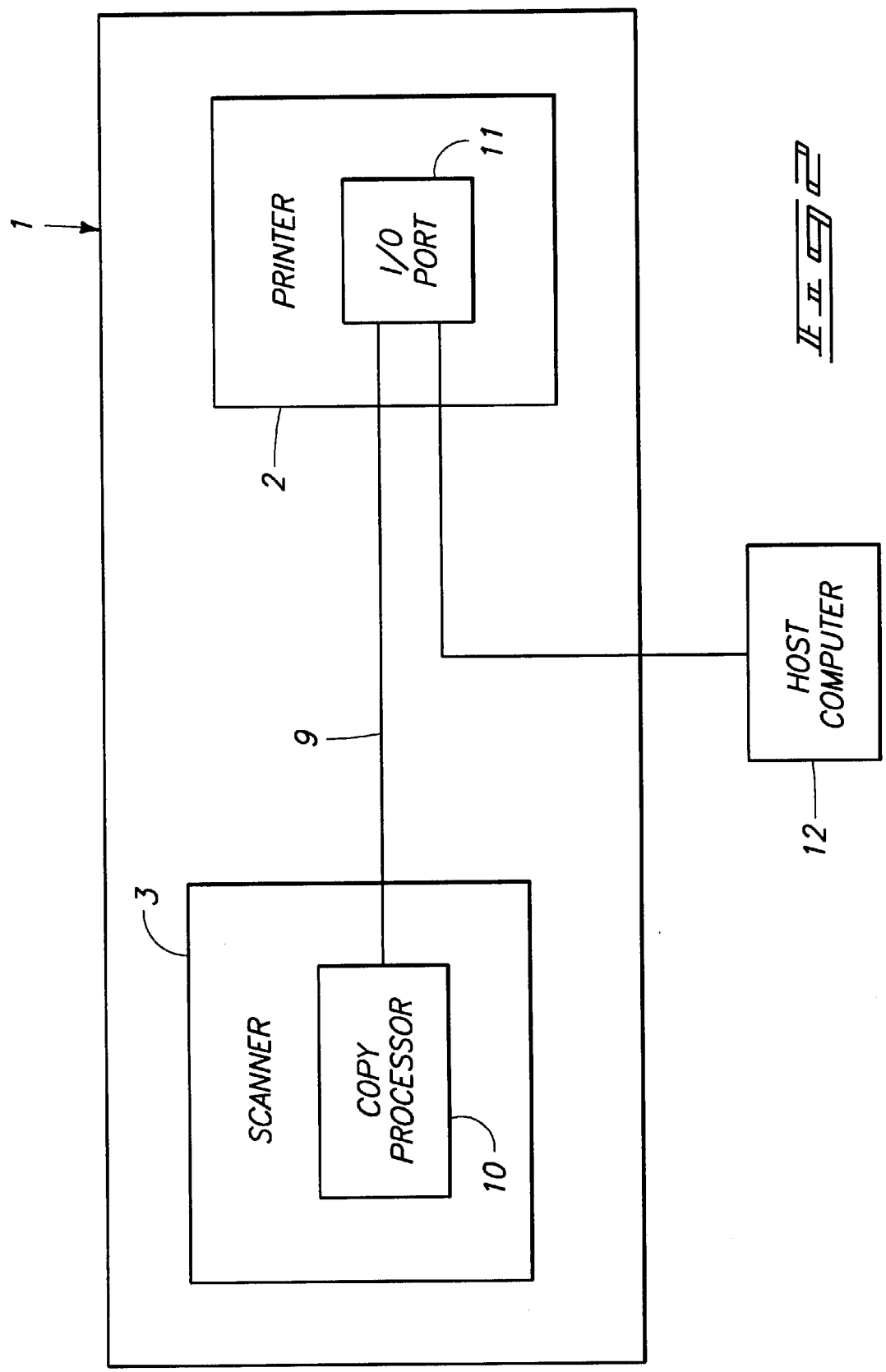
FIG. 2 is a functional block diagram of the printer system shown in FIG. 1.

Referring to FIG. 2, a high level functional block diagram of one embodiment of printer system 1 is illustrated. Printer system 1 includes printer 2 coupled with scanner 3. An interface 9 is coupled intermediate printer 2 and scanner 3.

FIG. 2 generally depicts communication channels intermediate various components and does not depict internal circuitry of the individual components. Scanner 3 includes a copy processor 10 configured to communicate data intermediate internal components of scanner 3 with interface 9. Printer 2 includes an input/output (I/O) port 11 configured to communicate data intermediate interface 9 and internal components of printer 2. In some embodiments, I/O port 11 is also configured to couple with an external host computer 12. Host computer 12 can be configured to communicate print description language (PDL) data and other information to I/O port 11 of printer 2.

Figure 3:
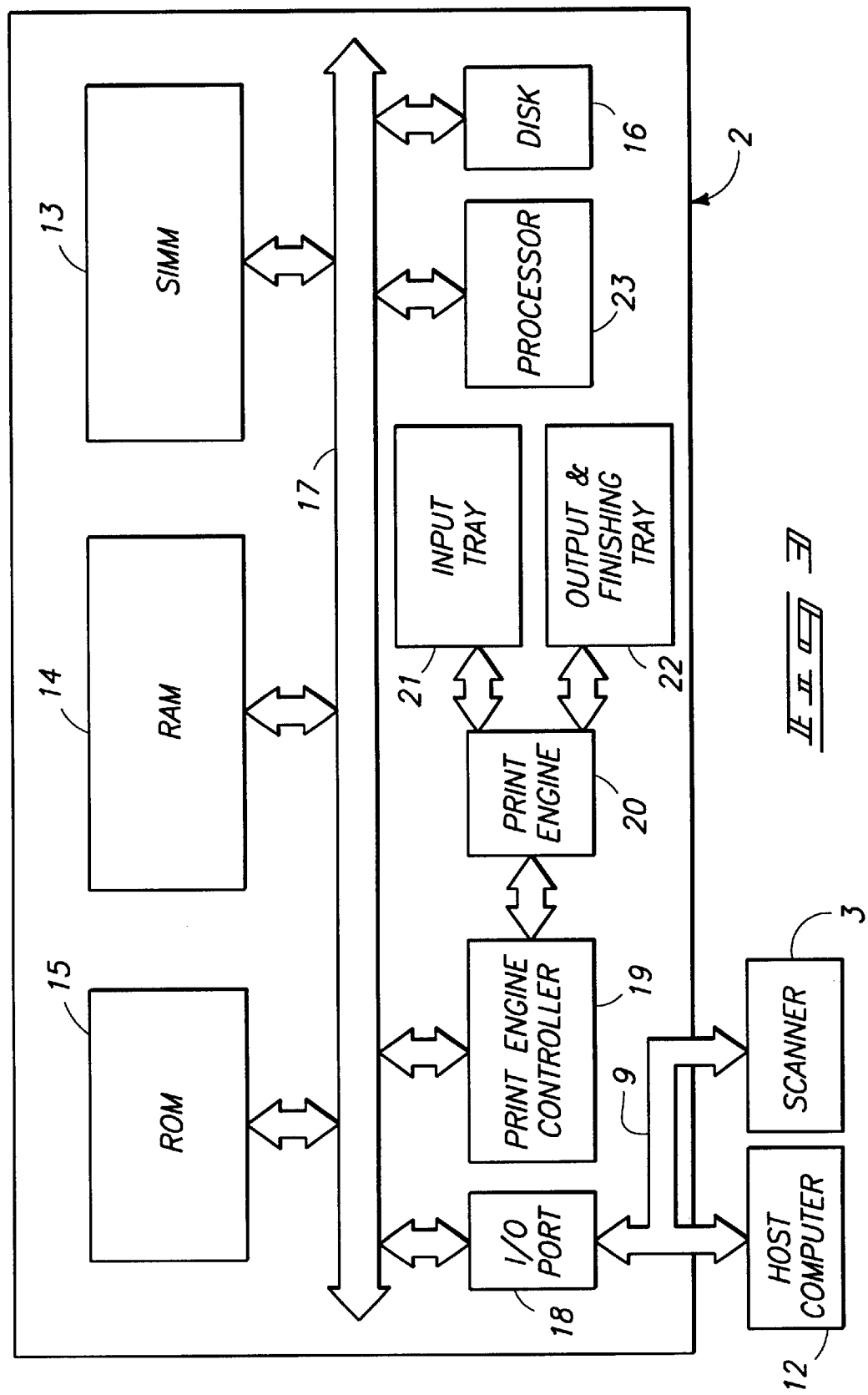
FIG. 3 is a functional block diagram of hardware components of an exemplary printer configuration of the printer system.

Referring to FIG. 3, hardware of an exemplary printer 2 is illustrated. The depicted printer 2 comprises a plurality of storage devices including a single-in-line-memory module (SIMM) device 13, random-access memory (RAM) device 14, read-only memory (ROM) device 15, and hard disk drive storage device 16. Storage device 13 can also comprise a dual-in-line-memory module (DIMM) in another arrangement. Individual storage devices 13, 14, 15, 16 are coupled with a bidirectional bus 17 for implementing data communications within printer 2.

Additional hardware of the depicted printer 2 includes an input/output (I/O) port 18, print engine controller 19, print engine 20, input tray 21, and output and finishing tray 22. Printer 2 additionally includes a processor 23, such as a microprocessor, configured to control functions of printer 2. Processor 23 communicates with other hardware elements of printer 2 via bus 17.

I/O port 18 comprises an input/output device adapted to couple with scanner 3 and host computer 12. Host computer 12 can include a personal computer or network computer arrangement external to printer 2. I/O port 18 can comprise a serial interface and/or a parallel interface which provide communications with scanner 3 and host computer 12. I/O port 18 receives image data from scanner 3 and page description language (PDL) data from host computer 12 for processing within printer 2. Further, other data can be communicated using I/O port 18.

Print engine controller 19 and associated print engine 20 are coupled to bus 17 and provide print output capability for printer 2 in but one embodiment. Sheet media is pulled from input tray 21 into print engine 20 and subsequently directed to output and finishing tray 22. Output and finishing tray 22 includes, in an exemplary embodiment, finishing feature mechanisms such as sheet registration, binding, stapling, punching, and the like, and may include one or more bins for collation or "mailbox" usage purposes. Input tray 21 may also include a plurality of input trays for varied media selection.

According to the described embodiment, print engine 20 is a multi-resolution capable engine. For example, it can print, selectively, at 600 or 1200 dots per inch (dpi). For purposes of this disclosure, print engine 18 is a laser printer that employs an electrophotographic drum imaging system. Other printers are utilized in other embodiments.

In general, the operation of printer 2 commences responsive to the reception of page description language data from host computer 12 or image data from scanner 3 via I/O port 18. The page description language data or image data is initially placed in random-access memory 14. Processor 23 accesses the page description language data and/or image data, and performs operations specified by firmware.

Random-access memory 14 provides main memory storage capabilities within printer 2 for storing and processing print job data streams received from host computer 12 and scanner 3. Random-access memory 14 comprises dynamic random-access memory (DRAM) in an exemplary embodiment. Read-only memory (ROM) 14 contains firmware which controls the operation of processor 23 and printer 2 including, for example, the inputting and outputting of data, rasterizing received data and controlling print engine 20 of printer 2.

Figure 4:
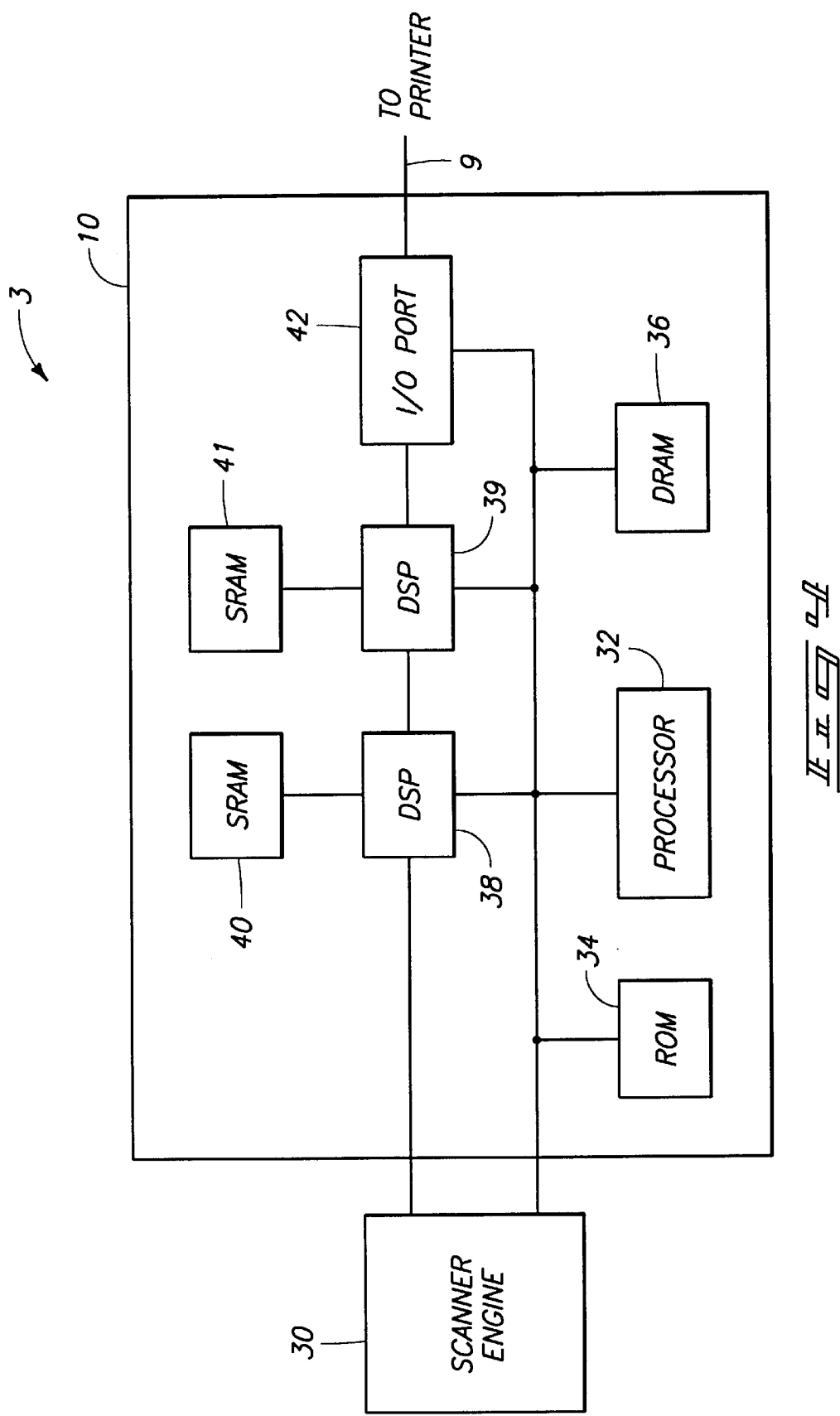
FIG. 4 is a functional block diagram of hardware components of an exemplary scanner configuration of the printer system.

Referring to FIG. 4, hardware of an exemplary scanner 3 is illustrated.

The depicted scanner 3 includes a copy processor 10 coupled with a scanner engine 30. Other arrangements of scanner 3 are possible. Copy processor 10 may be configured to provide the following functionality including: image processing, interfacing with printer 2, interfacing with and controlling scanner engine 30, operating user interface 6 of scanner 3, and mapping user settings to configuration data appropriate for internal processing of scanned images.

The depicted copy processor 10 includes an internal processor 32. One configuration of processor 32 comprises a 16-bit microprocessor having part designation 68306 available from Motorola, Inc. The depicted copy processor 10 also comprises a read-only memory device 34, a dynamic random-access memory (DRAM) storage device 36, plural digital signal processors (DSPs) 38, 39, plural static random-access memory (SRAM) storage devices 40, 41, and an I/O port 42.

During operation, a user can input commands via user interface 6 shown in FIG. 1. User inputted commands are received by copy processor 10. Scanner engine 30 is configured to scan provided images. Scanner engine 30 outputs image data corresponding to the received images to copy processor 10.

Communications intermediate scanner 3 and scanner engine 30 include a scanner control channel and an image data bus. Copy processor 10 can be connected to internal electronics of scanner engine 30. In the preferred embodiment, copy processor 10 acts as the master of communications with scanner engine 30 and thus, no unsolicited data flows from scanner engine 30 to copy processor 10. An exemplary control channel intermediate processor 32 and scanner engine 30 comprises a half-duplex asynchronous serial bus at TTL-levels. A scanner image bus coupled intermediate scanner engine 30 and first digital signal processor 38 comprises a unidirectional 8-bit parallel link providing communications at 10 MHZ in accordance with the described embodiment.

Processor 32 preferably controls displays of user interface 6 and also monitors user inputs provided into user interface 6. Processor 32 can include plural embedded peripherals including a DRAM controller, timers and UARTs for scanner communication and debug. Digital signal processors 38, 39 are configured to transfer image data intermediate scanner engine 30 and interface 9 for application to printer 2. Such enables processor 32 to control user interface 6 and PJL and PCL control sequences utilized to provide image transfers from scanner 3 to printer 2.

Image data is forwarded from scanner engine 30 into plural digital signal processors 38, 39. In one embodiment, digital signal processors 38, 39 individually comprise a part designation PM-44 DSP available from Pixel Magic, Inc. Digital signal processors 38, 39 are operable to provide a plurality of processing functions for received image data from scanner engine 30. For example, digital signal processors 38, 39 can be configured for functions including background removal, filtering, clipping, scaling, block rotation, resolution enhancement, sideband conversion, etc.

Individual SRAM storage devices 40, 41 are dedicated to respective digital signal processors 38, 39 and are available to temporarily store image data during the processing of the data. The processed image data is forward to I/O port 42 for application to printer 2. In particular, image data may be applied to interface 9 for application to printer 2 with PJL and PCL commands implemented by processor 32.

Preferably, printer 2 contains appropriate memory to store the transferred image data. Image data is stored within RAM 14 in the described configuration. Image data may be applied to printer 2 via interface 9 on a line-by-line basis as soon as processing is completed within digital signal processors 38, 39.

Interface 9 is configured to provide additional communications intermediate printer 2 and scanner 3. For example, printer status responses and user settings programmed via user interface 8 of printer 2 may be applied to copy processor 10 via interface 9. Likewise, user settings inputted via user interface 6 of scanner 3 may be applied to printer 2 via interface 9. Printer control commands can be outputted via copy processor 10 and applied to interface 9 and printer 2. In the preferred arrangement, copy processor 10 is the master of the communications with printer 2.

Printing system 1 of the present invention is configured to provide improved processing of multi-page flatbed jobs. Copy processor 10 requests the user to indicate the type of upcoming print job. A user initially inputs a command into scanner 3 to request job binding. Job binding can be utilized to generate plural collated copies from plural input pages scanned using flatbed scanning techniques. The user can also indicate whether duplex or N-Up printing is to be provided within the job binding operation.

Thereafter, printer system 1 is configured to provide job binding operations in accordance with the present invention. Printer system 1 implementing job binding operations can create plural collated copies of plural original input pages from flatbed 5 without the need to generate an intermediate copy (also referred to as a one-off copy of the originals). Such provides improved image quality.

During operation in job binding mode, images are scanned from pages placed upon flatbed 5 by scanner engine 30. Inasmuch as flatbed scanning is utilized, the scanned pages can have a plurality of different sizes. The scanned images are applied to printer 2 via interface 9 and are stored within hard disk drive 16 thereof. If plural collated copies of the original images are to be made, printer 2 typically will not proceed to make such copies until the last page has been scanned by scan engine 30. The user can indicate when no more pages are to be scanned. Following completion of the scanning operation of the print job, printer 2 is configured to output plural copies of the print job. The copies may be individually collated, stapled, etc.

In some configurations, printer 2 begins to print and output a first copy of the print job before the last image of the print job is scanned. However, subsequent copies of the print job are usually not printed until the last image of the print job has been scanned. Thereafter, plural copies of the print job can be generated and outputted.

Following the receipt of appropriate commands from the user via user interface 6 indicating a job binding print job, copy processor 10 is configured to send a "begin job" request to the printer. This request specifies the number of copies to be made and the printer destination bin (e.g., stapler, particular mailbox, etc.).

Thereafter, copy processor 10 sends a "begin page" request to printer 3. The "begin page" request specifies the paper source (e.g., paper size, media type, input tray, or some combination thereof) for the output page. This request also specifies the orientation and origin of the output page.

After printer 3 acknowledges the "begin page" request, copy processor 10 sends a "begin image" command which can include the starting position of the image, the color space (e.g., RGB), the color mapping (e.g., additive gray), the color depth (e.g., one bit per pixel), the source width and height, and the destination width and height. Thereafter, copy processor 10 scans the flatbed 5 and sends the image data to printer 3. After the image data is sent, copy processor 10 sends an "end image" command. Image data corresponding to a plurality of scanned pages can be sent for one output page when N-Up copying is selected. After all data is sent for one output page, copy processor 10 is configured to send an "end page" command.

Since multi-page flatbed jobs include a multiple of input pages, the user is prompted to put in another input page and press the go key after individual input pages. The exact prompt depends upon the options the user has selected (e.g., "place side two of page X on 'glass' for the backside of a duplex page").

The user can select a "no more input pages" softkey anytime the user is prompted to put in another input page. When the user presses this key, copy processor 10 sends the "end page" command to finish the current output page. Thereafter, copy processor 10 sends the "end job" command to finish the current print job. An inactivity timer can be associated with this process. The timer resets each time the user pushes the "go" or "start" key. If the timer expires, copy processor 10 acts as if the user has pressed the "no more input pages" softkey and operates accordingly.

If N-Up or duplex printing is selected by the user, image data from multiple input pages are sent per output page. Copy processor 10 can selectively scale the scanned image data and provide the starting position and the height and width of individual image blocks. Copy processor 10 sends only one "begin page" request per output page. If the user presses a "stop" key during this process, copy processor 10 sends a cancel job command to printer 2. If the scanner/printer status changes while waiting for printer 2 to acknowledge an outstanding request, scanner 3 processes the status event. Some status events may cause copy processor 10 to return to an earlier state or a device attendance mode. For example, if printer 2 runs out of paper during printing, printer 2 enters a device attendance mode wherein scanner 3 prompts the user to check the status of printer 2. Following the resolution of the condition requiring attendance, scanner 3 returns to its previous position in the scanning process. Any timeout counters can be reset following the device attendance mode.

Figure 5:
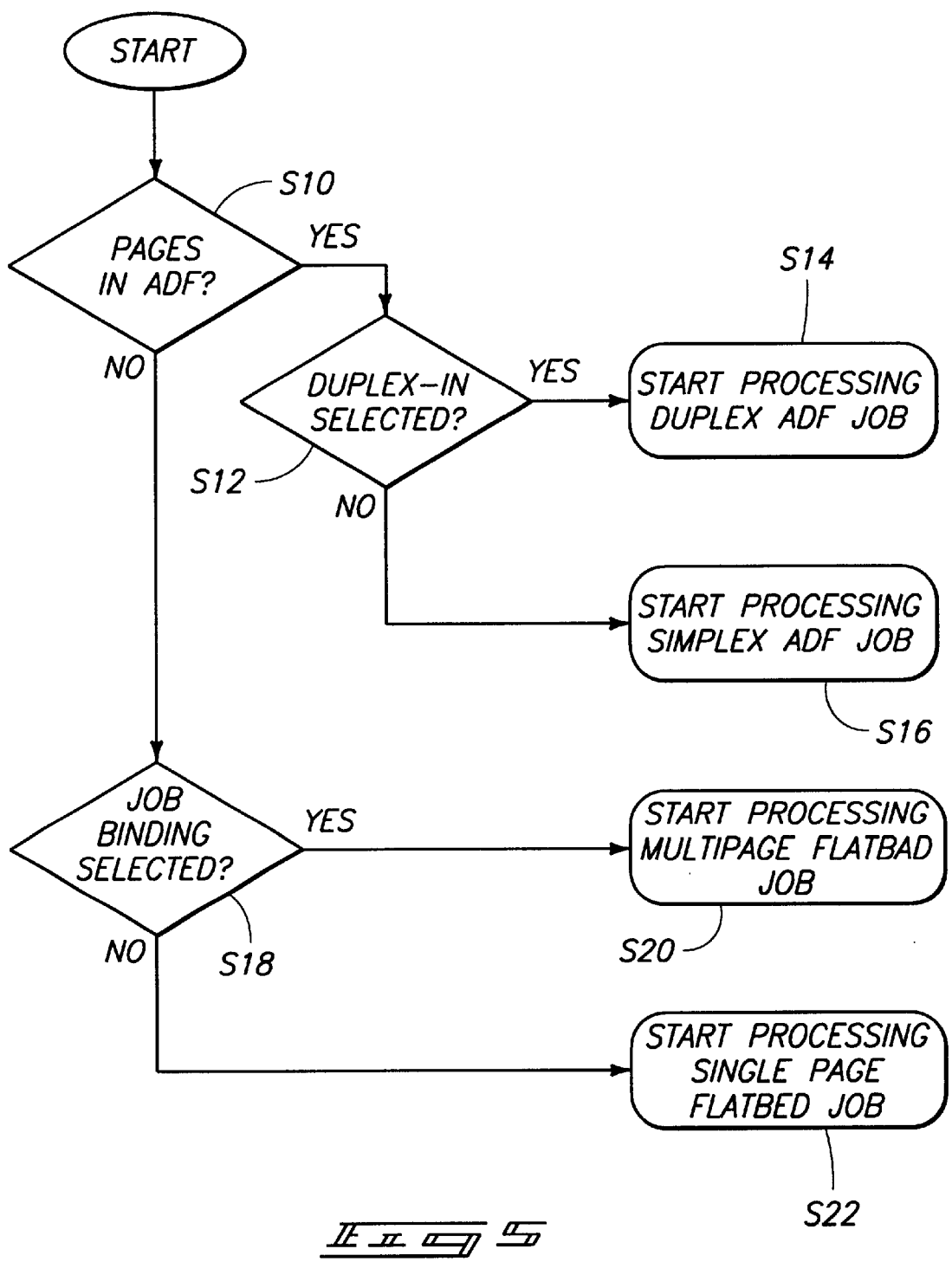
FIG. 5 is a flow chart illustrating one method for determining the type of processing to be performed by the printer system.

Referring to FIG. 5 and FIG. 6, an exemplary method is depicted for implementing job binding in accordance with the present invention. The following procedure can be implemented within firmware of scanner 3 and executed by processor 32.

Referring to FIG. 5, procedure for processing a print job including selection of a copy job type is depicted. It is determined whether the user has placed pages within the automatic document feeder 4 at step S10. If it is determined at step S10 that pages are present in automatic document feeder 4, processor 32 proceeds to step S12 to determine whether duplex-in copying is selected by the user. Processor 32 begins implementing processing of a duplex automatic document feeder print job at step S14 if duplex-in print copying is selected at step S12. Alternatively, processor 32 begins processing of a simplex automatic document feeder print job at step S16 responsive to duplex-in copying not be selected at step S12.

Responsive to no pages being present in automatic document feeder 4 at step S10, processor 32 proceeds to step S18 for flatbed processing and to determine whether job binding is selected by the user. Job binding is typically selected when the user requests more than one copy of a print job and collated copies are requested. Processor 32 implements processing of a multi-page flatbed job at step S20 responsive to job binding being selected at step S18. Alternatively, processor 32 implements processing of a single page flatbed print job at step S22 responsive to job binding not being selected at step S18.

Referring to FIG. 6, job binding processing of a multi-page flatbed print job (indicated in step S20 of FIG. 5) is described according to one methodology of the present invention. Following entry into the multi-page flatbed processing mode, processor 32 proceeds to step S30 to scan an image from flatbed 5 following the user depressing a "start" key.

Thereafter, processor 32 proceeds to step S32 to prompt the user via user interface 6 to determine whether another page will be added to the print job. At step S34, processor 32 awaits input from the user via user interface 6. If no input is received at step S34, processor 32 proceeds to step S36 to monitor whether a predefined time out period has elapsed. If the time out period has elapsed, processor 32 ends the copy job. If the time out period has not elapsed as determined at step S36, processor 32 returns to step S34 to await input from the user.

Responsive to user input being entered, processor 32 proceeds to step S38 to determine whether the "no" soft key has been depressed responsive to the "add another page to job" query. Processor 32 ends the copy job if the user has depressed the "no" soft key. Alternatively, processor 32 proceeds to step S40 responsive to the user not depressing the "no" soft key. At step S40, it is determined whether the user has depressed the "stop" key. Processor 32 cancels the copy job if the user has depressed the "stop" key. Otherwise, processor 32 proceeds to step S42 to determine whether the user has pressed the "yes" soft key. Processor 32 returns to step S34 if the user has not pressed the "yes" soft key.

Processor 32 proceeds to step S44 to prompt the user to press the "start" key to continue responsive to the "yes" soft key being depressed at step S42. Thereafter, processor 32 proceeds to step S46 to determine whether the user has provided input. Processor 32 proceeds to step S48 to determine whether a predefined timeout period has elapsed responsive to a waiting condition at step S46. The copy job ends if the timeout period has elapsed as determined by step S48. Otherwise, processor 32 returns to step S46 responsive to the time out period not being elapsed.

Following user input via user interface 6, processor 32 proceeds to step S49 to determine whether the "stop" key has been pressed. Processor 32 cancels the copy job if the user has depressed the "stop" key. Alternatively, processor 32 proceeds to step S50 to determine whether the user has pressed the "start" key. If not, processor 32 returns to step S46 to wait for reception of user input. Otherwise, processor 32 returns to step S32 to scan another image from flatbed 5.

The job binding copying process in accordance with the present invention can additionally implement copying of multiple input pages via flatbed 5 for a single output page (e.g., N-Up copying). In particular, processor 32 can query the user whether additional input pages are desired to finish the current output page. If so, processor 32 requests the next page and does not yet send an "end page" command to printer 2. Once it is determined no more input pages are needed to finish the current page, processor 32 outputs the "end page" command to printer 2.

Referring to FIG. 7, an exemplary flow chart is shown depicting one methodology for processing a flatbed N-Up print job in accordance with the present invention. Job binding is utilized to provide processing of multi-page N-Up print jobs from flatbed 5 of scanner 2. Following the selection of an N-Up print job (e.g., 2-Up, 4-Up, etc.) and the user presses start, processor 32 proceeds to step S60 to determine whether there are pages in automatic document feeder (ADF) 4. If pages are present in automatic document feeder 4, processor 32 proceeds to step S62 to process the print job from automatic document feeder 4 in a normal manner. Alternatively, processor 32 proceeds to step S64 to implicitly enable job binding. As described below, job binding requests the user to input whether additional input pages are needed to complete either a single output page or the print job. A complete print job is printed via printer 3 following an indication from the user there are no more input pages to be scanned. Such enables printer 3 to collate, staple, etc. the print jobs as well as provide N-Up printing from flatbed 5 of scanner 3.

Following the enablement of job binding, processor 32 proceeds to step S66 and sends a "begin job" and "begin page" request to printer 2. Thereafter, the input page is flatbed scanned using scanner 3 and image data corresponding thereto is provided to printer 2 at step S68. Thereafter, processor 32 proceeds to step S70 and decides whether more input pages are needed to finish the output page. Responsive to no more pages being needed, processor 32 proceeds to step S72 and forwards an "end page" command and a "begin page" request to printer 2. Otherwise, processor 32 proceeds to step S74 and prompts the user to indicate whether another page is to be added to the print job. Responsive to the user indicating no more pages are to be added, processor 32 proceeds to step S76 and sends "end page" and "end job" commands to printer 2. Thereafter, the scanner enters an idle state. Otherwise, processor 32 proceeds to step S78 and waits for the user to press the "start" button.

Processor 32 scans the input page and sends image data corresponding to the page to printer 2 at step S68 responsive to the user pressing the "start" button. Alternatively, processor 32 proceeds to step S80 where it is determined whether the scanner/printer status has changed. Processor 32 processes the scanner/printer status event responsive to a change in status at step S82. If the status has not changed, processor 32 proceeds to step S84 and determines whether the "stop" button is pressed. If the "stop" button is not pressed, processor 32 returns to step S78. Otherwise, processor 32 proceeds to step S86 and cancels the current copy job and scanner 3 enters an idle state.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A printing system comprising:
   a scanner including an image reception device configured to flatbed scan a print job including a plurality of pages and output image data corresponding to the pages;
   a print engine controller coupled with the scanner and configured to receive the print job including the image data corresponding to the pages;
   a print engine coupled with the print engine controller and configured to print a plurality of collated copies of the print job; and
   wherein the print engine is configured to print the collated copies of the print job which has been flatbed scanned after flatbed scanning the pages of the print job and after a user indicates no additional pages are to be flatbed scanned.

2. The printing system according to claim 1 further comprising a storage device configured to store the image data.

3. The printing system according to claim 2 wherein the storage device, the print engine controller and the print engine are implemented within a printer.

4. The printing system according to claim 3 wherein the storage device comprises a hard disk drive of the printer.

5. The printing system according to claim 3 wherein the scanner and the printer comprise individual devices.

6. The printing system according to claim 5 further comprising an interface configured to communicate the image data intermediate the scanner and the printer.

7. The printing system according to claim 1 wherein the print engine is configured to print the plurality of collated copies following the scanning of the plurality of pages of the print job using the scanner.

8. The printing system according to claim 1 wherein the print engine is configured to print the plurality of collated copies following the scanning of a last page of the print job using the scanner.

9. The printing system according to claim 1 wherein the print engine controller is configured to form portions of individual copies of the print job to include at least one of duplex pages and N-Up pages.

10. A method of reproducing an image comprising:
    providing a scanner;
    coupling a printer with the scanner;
    flatbed scanning a print job comprising a plurality of pages using the scanner;
    printing a plurality of collated copies of the print job using the printer; and
    receiving an indication from a user that no additional pages of the print job are to be scanned after the flatbed scanning, and wherein the printing is responsive to the receiving.

11. The method according to claim 10 wherein the printing follows the scanning of the plurality of pages.

12. The method according to claim 10 wherein the printing follows the scanning of a last page of the print job.

13. The method according to claim 10 wherein the printing comprises printing at least one page including a plurality of images from a plurality of the scanned pages.

14. The method according to claim 10 wherein the printing comprises at least one of duplex printing and N-Up printing portions of individual copies of the print job.

15. The method according to claim 10 further comprising storing image data corresponding to the pages within a storage device following the scanning.

16. The method according to claim 10 wherein the scanning and printing comprise scanning and printing using individual devices.

17. A method of reproducing an image comprising:
    providing a scanner;
    coupling a printer with the scanner;
    flatbed scanning a plurality of input pages using the scanner;
    outputting image data from the scanner which corresponds to the input pages;
    printing at least one output page having image data from plural input pages using the printer; and
    receiving an indication from a user that no additional pages of the print job are to be scanned after the flatbed scanning, and wherein the printing is responsive to the receiving.

18. The method according to claim 17 further comprising storing the image data before the printing.

19. The method according to claim 17 wherein the flatbed scanning comprises scanning a print job including a plurality of input pages and the printing comprises printing a plurality of collated copies of the print job individually including a plurality of output pages.

20. The method according to claim 17 wherein the scanning and printing comprise scanning and printing using individual devices.

21. The printing system according to claim 1 wherein the scanner is configured to flatbed scan a print job without usage of an automatic document feeder.

22. The method according to claim 10 wherein the flatbed scanning comprises flatbed scanning the print job comprising the plurality of pages manually placed by a user directly upon the scanner.

23. The method according to claim 17 wherein the flatbed scanning comprises flatbed scanning without usage of an automatic document feeder.

* * * * *